United States Patent
Schramm et al.

(10) Patent No.: US 9,312,783 B2
(45) Date of Patent: Apr. 12, 2016

(54) VOLTAGE SOURCE CURRENT CONTROLLED MULTILEVEL POWER CONVERTER

(71) Applicant: General Electric Company, Schenectady, NY (US)

(72) Inventors: Simon Herbert Schramm, Moosach (DE); Thomas Brueckner, Munich (DE); Stefan Schroeder, Munich (DE); Christof Martin Sihler, Hallbergmoos (DE); Sebastian Pedro Rosado, Munich (DE)

(73) Assignee: General Electric Company, Niskayuna, NY (US)

( * ) Notice: Subject to any disclaimer, the term of this patent is extended or adjusted under 35 U.S.C. 154(b) by 622 days.

(21) Appl. No.: 13/717,802

(22) Filed: Dec. 18, 2012

(65) Prior Publication Data

US 2014/0167508 A1    Jun. 19, 2014

(51) Int. Cl.
*H02J 3/00* (2006.01)
*H02M 7/217* (2006.01)
*H02M 3/07* (2006.01)
*H02M 3/158* (2006.01)
(Continued)

(52) U.S. Cl.
CPC ............ *H02M 7/217* (2013.01); *H02M 3/07* (2013.01); *H02M 3/158* (2013.01); *H02M 5/458* (2013.01); *H02M 7/483* (2013.01); *H02M 2007/4835* (2013.01); *Y10T 307/406* (2015.04)

(58) Field of Classification Search
USPC .......................................................... 307/31
See application file for complete search history.

(56) References Cited

U.S. PATENT DOCUMENTS 6,005,788 A    12/1999 Lipo et al.
6,459,596 B1 * 10/2002 Corzine ........................ 363/37
(Continued)

FOREIGN PATENT DOCUMENTS

| CN | 102055347 A | 5/2011 |
| EP | 0891037 A2 | 1/1999 |
| WO | 2011100738 A1 | 8/2011 |
| WO | 2011124258 A1 | 10/2011 |

(Continued)

OTHER PUBLICATIONS

Lesnicar et al.; An Innovative Modular Multilevel Converter Topology Suitable for a Wide Power Range; Power Tech Conference Proceedings; 2003 IEEE Bologna, Issue Date : Jun. 23-26, 2003, vol. 3; 6 Pages.

(Continued)

*Primary Examiner* — Ronald W Leja
(74) *Attorney, Agent, or Firm* — Ann M. Agosti

(57) ABSTRACT

A power converter module including a voltage source current controlled power converter for providing unidirectional current having at least four output voltage levels is provided. The voltage source current controlled power converter includes an input terminal and an output terminal, and a first conductive path and a second conductive path is coupled in parallel to each other between the input terminal and the output terminal. Each of the conductive paths comprises at least one diode and at least one switch coupled in series to the respective conductive path. The at least one diode in the first conductive path are coupled closer to the input terminal and the at least one diode in the second conductive path are coupled closer to the output terminal. The voltage source current controlled power converter further includes at least two energy storage elements coupled between the first conductive path and the second conductive path.

20 Claims, 11 Drawing Sheets

(51) Int. Cl.
*H02M 7/483* (2007.01)
*H02M 5/458* (2006.01)

(56) References Cited

U.S. PATENT DOCUMENTS

| | | | |
|---|---|---|---|
| 8,044,537 | B2 | 10/2011 | Asplund et al. |
| 8,547,717 | B2 * | 10/2013 | Kshirsagar .................... 363/127 |
| 2005/0083716 | A1 | 4/2005 | Marquardt |
| 2012/0063185 | A1 | 3/2012 | Janning |
| 2012/0069610 | A1 | 3/2012 | Trainer et al. |
| 2012/0112545 | A1 | 5/2012 | Aiello et al. |
| 2013/0014384 | A1 * | 1/2013 | Xue et al. ......................... 29/825 |
| 2013/0063995 | A1 * | 3/2013 | Norrga et al. ................. 363/125 |
| 2014/0049230 | A1 * | 2/2014 | Weyh ............................ 323/207 |
| 2014/0167508 | A1 * | 6/2014 | Schramm et al. ................ 307/31 |
| 2014/0169040 | A1 * | 6/2014 | Schroeder et al. ......... 363/21.01 |

FOREIGN PATENT DOCUMENTS

| | | |
|---|---|---|
| WO | 2011124260 A1 | 10/2011 |
| WO | 2011127980 A1 | 10/2011 |
| WO | 2011127984 A1 | 10/2011 |
| WO | 2012055435 A1 | 5/2012 |

OTHER PUBLICATIONS

European Search Report and Written Opinion issued in connection with corresponding EP Application No. 13196286.2-1809 dated Dec. 2, 2014.

EP Search Report and Written Opinion dated Mar. 19, 2014 issued in connection with corresponding EP Patent Application No. 13196286.2.

European Office Action issued in connection with corresponding EP Application No. 13196286.2 on Jun. 15, 2015.

* cited by examiner

VOLTAGE SOURCE CURRENT CONTROLLED MULTILEVEL POWER CONVERTER

BACKGROUND

Embodiments of the invention generally relate to power converters and more particularly to multilevel power converters.

There is a growing need to deliver power over long distances to remote locations which often requires transmission systems which are based on high voltage power transmission due to transmission efficiency and power transfer capability concerns. Historically alternating current (AC) transmission systems have been used for high voltage power transmission, however, the AC transmission systems suffer from undesired cable capacitance that results in charging current requirements. In contrast, high voltage direct current (HVDC) transmission provides a more efficient way to transmit high voltage power over long distances.

In an HVDC transmission system, power converters are often used to convert AC power to DC power at the transmitting substation and to convert the transmitted DC power back to AC power at the receiving substation. In one approach, these power converters have a modular multilevel structure where each phase has a stacked arrangement of modules.

Each of the modules comprises an AC-DC power converter that converts a fraction of the AC power to the DC power at the transmitting substation. In one approach, the modular AC-DC power converters include voltage source power converters which are coupled to each other to form a modular stacked multilevel power converter that supports a unidirectional DC current flow. However, presently two level and three level voltage source modular power converters are used which results in a high number of modules being coupled together to form the modular stacked power converter with a desired AC-DC power conversion capability. Higher numbers of modules results in complexity and high costs.

Hence, there is a need for an improved system to address the aforementioned issues.

BRIEF DESCRIPTION

Briefly, in accordance with one embodiment, a power converter module is provided. The power converter module includes a voltage source current controlled power converter for providing unidirectional current having at least four output voltage levels. The voltage source current controlled power converter includes an input terminal for receiving modular input current and an output terminal for providing modular output current. The voltage source current controlled power converter also includes a first conductive path and a second conductive path coupled in parallel to each other between the input terminal and the output terminal, wherein each of the conductive paths comprises at least one diode coupled in series to the respective conductive path and at least one switch coupled in series to the respective conductive path. The at least one diode in the first conductive path is coupled closer to the input terminal than the output terminal, and the at least one diode in the second conductive path is coupled closer to the output terminal than the input terminal. The voltage source current controlled power converter further includes at least two energy storage elements coupled between the first conductive path and the second conductive path.

In another embodiment, an alternating current (AC) power to direct current (DC) power conversion system is provided. The AC-DC power conversion system includes a power source configured to provide system input power. The AC-DC power conversion system also includes at least one phase set of power converter modules coupled in series to each other for converting at least one phase of the system input power to a system output power. Each of the power converter modules includes a voltage source current controlled power converter for providing unidirectional current having at least four output voltage levels. The voltage source current controlled power converter includes an input terminal for receiving modular input current and an output terminal for providing modular output current. The voltage source current controlled AC-DC converter also includes a first conductive path and a second conductive path coupled in parallel to each other between the input terminal and the output terminal, wherein each of the conductive paths comprises at least one diode coupled in series to the respective conductive path and at least one switch coupled in series to the respective conductive path. The at least one diode in the first conductive path is coupled closer to the input terminal than the output terminal, and the at least one diode in the second conductive path is coupled closer to the output terminal than the input terminal. The voltage source current controlled power converter further includes at least two energy storage elements coupled between the first conductive path and the second conductive path. The AC-DC power conversion system further includes at least one receiver end power converter module coupled to the at least one phase set of power converter modules via a DC link.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include a power converter module that comprises a voltage source current controlled power converter which provides unidirectional current and has at least four output voltage levels. The voltage source current controlled power converter includes an input terminal that receives modular input current and an output terminal that provides modular output current. The voltage source current controlled power converter also includes a first conductive path and a second conductive path coupled in parallel to each other between the input terminal and the output terminal, wherein each of the conductive paths comprises at least one diode coupled in series to the respective conductive path. The at least one diode in the first conductive path is coupled closer to the input terminal than the output terminal, and the at least one diode in the second conductive path is coupled closer to the output terminal than the input terminal. The voltage source current controlled power converter further includes energy storage elements coupled between the first conductive path and the second conductive path.

As described hereinafter, the term "modular input current" is defined as the input current that is received by one power converter module, and the term "modular output current" is defined as the output current that is provided by one power converter module. The term "system input power" is defined as the input power received by the AC-DC power conversion system including the power converter modules. The term "system output power" is defined as the output power that is provided by the AC-DC power conversion system.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit," "circuitry," "controller," and "processor" may include either a single component or a plurality of components, which are either active and/or passive and are connected or otherwise coupled together to provide the described function.

Figure 1:
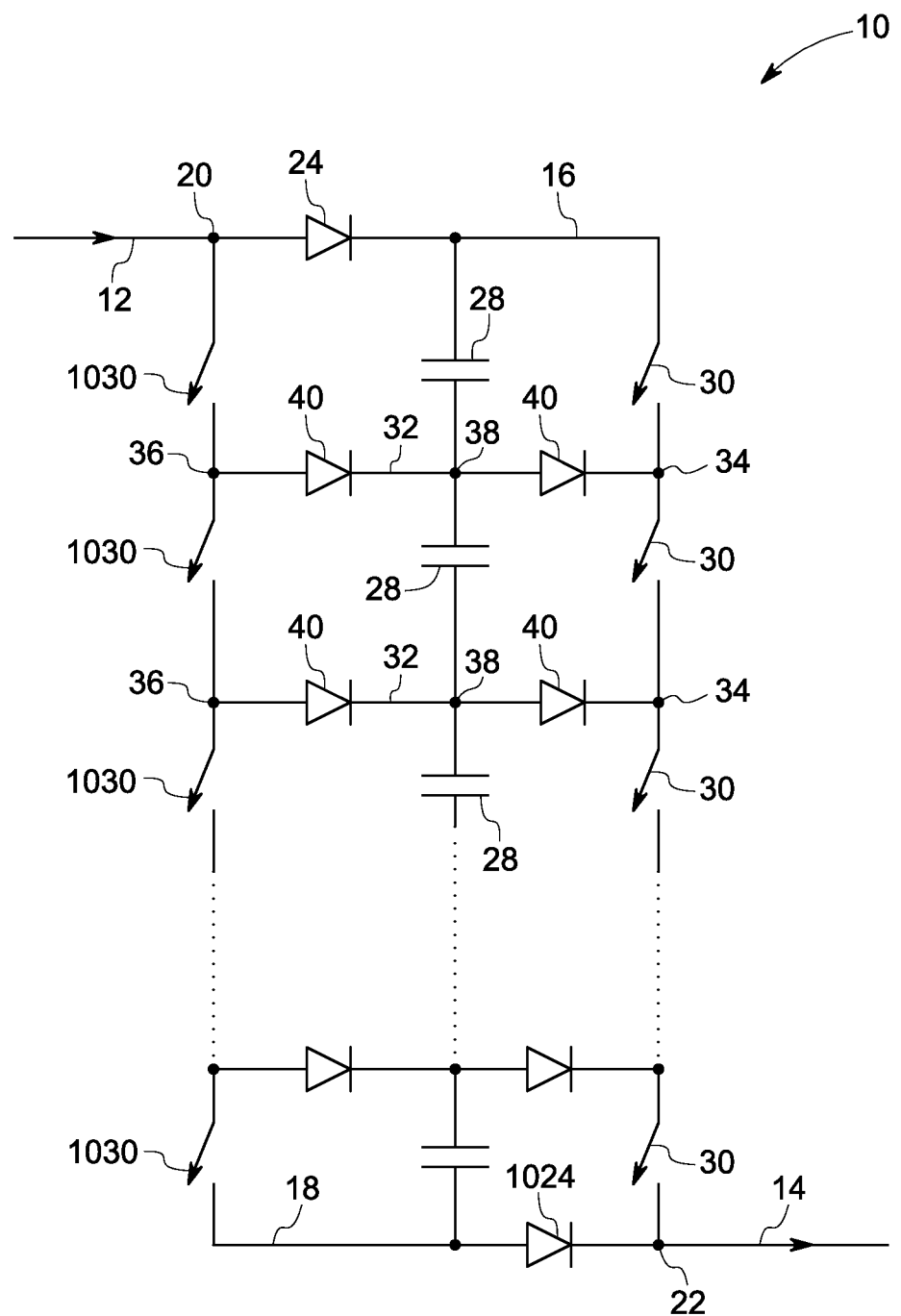
FIG. 1 is a schematic representation of a voltage source current controlled power converter including N voltage levels in a diode clamped configuration in accordance with an embodiment of the invention.

FIG. 1 is a schematic representation of a voltage source current controlled power converter 10 including N voltage levels in a diode clamped configuration in accordance with an embodiment of the invention. The voltage source current controlled power converter 10 includes an input terminal 12 that is coupled to a power source (not shown) and receives a modular input current from the power source. The voltage source current controlled power converter 10 further includes an output terminal 14 that provides a modular output current. The voltage source current controlled power converter 10 includes a first conductive path 16 and a second conductive path 18 coupled in parallel to each other. The first conductive path 16 and the second conductive path 18 are coupled to the input terminal 12 at a first end 20 and to the output terminal 14 at a second end 22. Each of the first conductive path 16 and the second conductive path 18 includes at least one diode 24, 1024 coupled in series to the respective conductive paths wherein the at least one diode 24 of the first conductive path 16 is coupled closer to the input terminal 12 than the output terminal 14 and the at least one diode 1024 of the second conductive path 18 is coupled closer to the output terminal 14 than the input terminal 12. The voltage source current controlled power converter 10 also includes energy storage elements 28 coupled between the first conductive path 16 and the second conductive path 18. In a specific embodiment, the energy storage element 28 includes a capacitor.

In the specific embodiment of the diode clamped voltage source current controlled power converter 10, the voltage source current controlled power converter 10 includes switches 30, 1030 in the first conductive path 16 and the second conductive path 18 wherein the switches 30, 1030 in the respective conductive paths 16, 18 are coupled in series to each other. In a specific embodiment, the switches 30, 1030 comprise unidirectional current switches. In a more specific embodiment, the switches 30, 1030 comprise thyristors, insulated gate bipolar transistors (IGBT) or integrated gate-commutated thyristors (IGCT). The voltage source current controlled power converter 10 includes converter legs 32 coupled between the first conductive path 16 and the second conductive path 18 wherein each converter leg 32 is coupled between a respective pair of switches 30 in the first conductive path 16 at a first node 34 and between a corresponding pair of switches 1030 in the second conductive path 18 at a second node 36. Further, each of the converter leg 32 is coupled between a respective pair of energy storage elements 28 at an intermediate node 38, and each converter leg 32 includes two leg diodes 40 coupled in series to each other such that the intermediate node 38 is positioned between the two leg diodes 40. The number of switches 30, 1030, the number of converter legs 32, and the number of energy storage elements 28 for the voltage source current controlled power converter 10 is determined based on a number of voltage levels that is required between the input terminal 12 and the output terminal 14.

Figure 2:
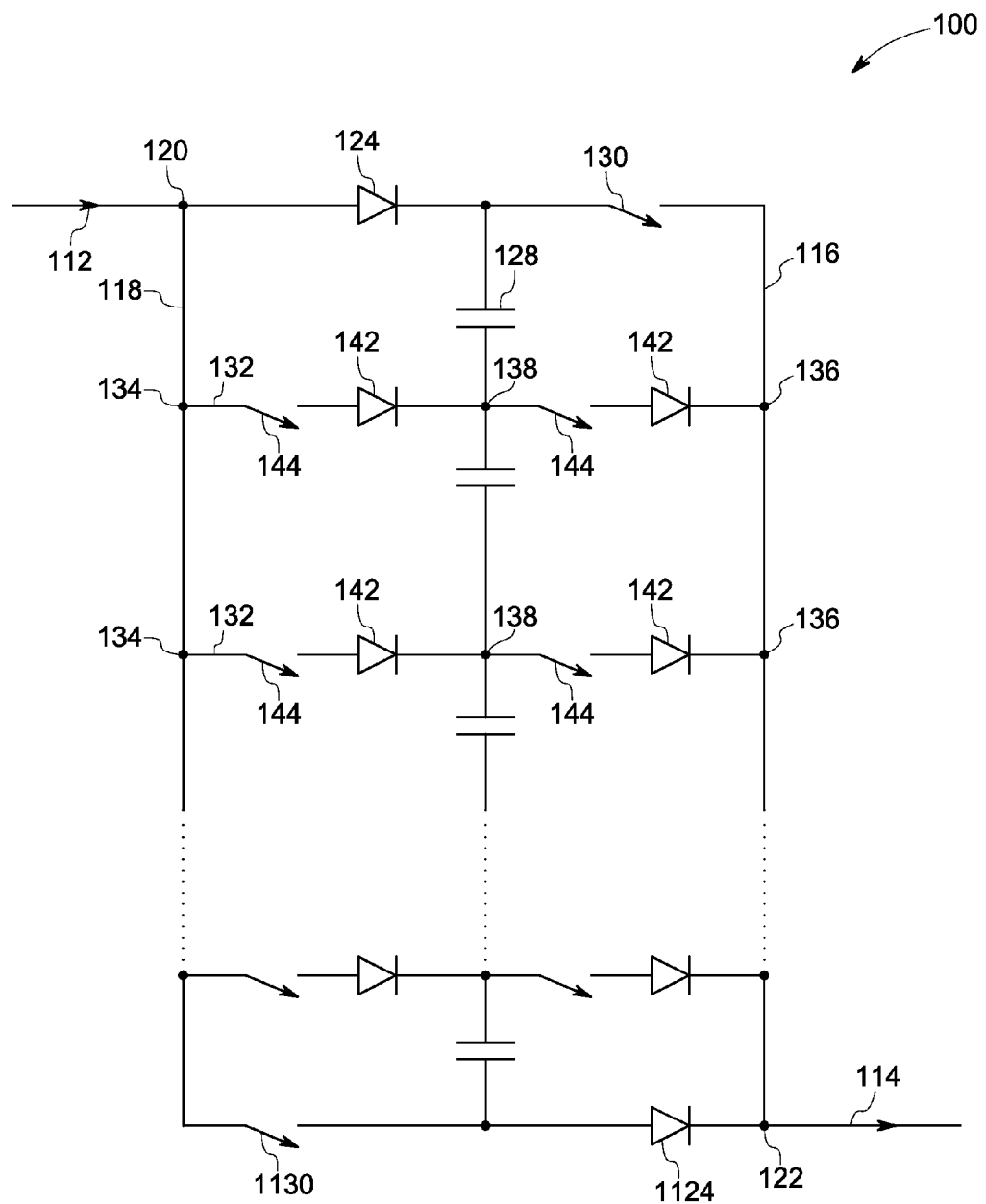
FIG. 2 is a schematic representation of a voltage source current controlled power converter including N voltage levels in an actively clamped configuration in accordance with an embodiment of the invention.

FIG. 2 is a schematic representation of a voltage source current controlled power converter 100 including N voltage levels in an actively clamped configuration in accordance with an embodiment of the invention. In this embodiment, the voltage source current controlled power converter 100 includes an actively clamped configuration which includes the first conductive path 116 and the second conductive path 118 coupled in parallel to each other, and the first conductive path 116 and the second conductive path 118 are coupled to the input terminal 112 at the first end 120 and to the output terminal 114 at the second end 122. Each of the conductive paths 116, 118 includes at least one diode 124, 1124 coupled in series to the respective conductive paths and at least one switch 130, 1130 coupled in series to the respective conductive paths. The voltage source current controlled power converter 100 also includes energy storage elements 128 coupled between the first conductive path 116 and the second conductive path 118.

The voltage source current controlled power converter 100 includes converter legs 132 coupled between the first conductive path 116 and the second conductive path 118 at the first node 134 and the second node 136 respectively wherein each converter leg 132 is coupled between a respective pair of energy storage elements 128 at an intermediate node 138. Each converter leg 132 includes at least one leg switch 144, at least one leg diode 142 or a combination thereof on both sides of the intermediate node 138. In a more specific embodiment, the converter leg 132 includes a leg switch 142 and a leg diode 144 on both sides of the intermediate node 138. In another embodiment, each converter leg 132 may include a switching device that provides the same reverse blocking capabilities as provided by the leg switch 142 and the leg diode 144 on both sides of the intermediate node 138. The number of converter legs 132 and the number of energy storage elements 128 for the actively clamped configuration of the voltage source current controlled power converter 100 is determined based on a number of voltage levels that is required between the input terminal 112 and the output terminal 114.

Figure 3:
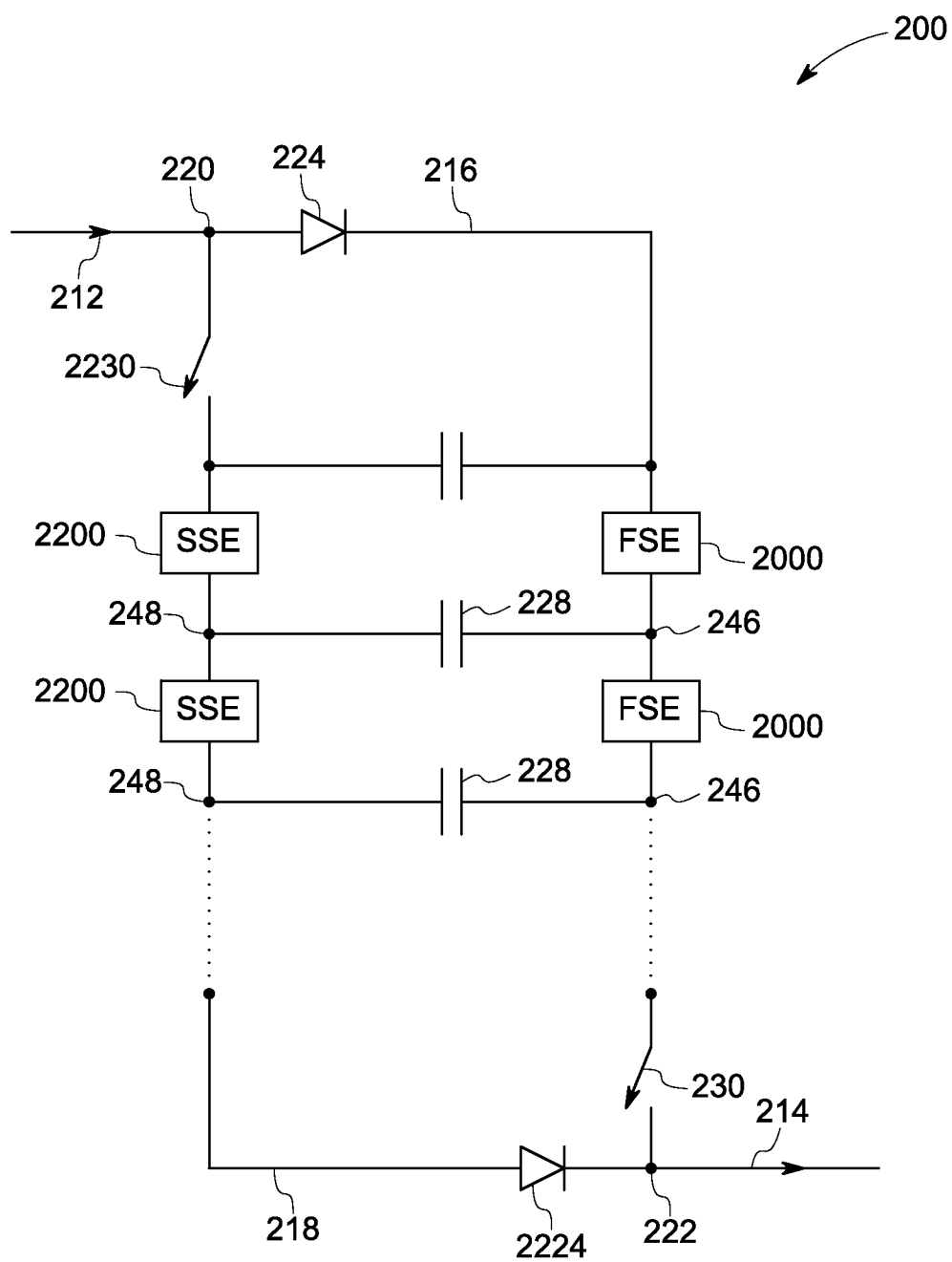
FIG. 3 is a schematic representation of a voltage source current controlled power converter including N voltage levels in a floating capacitor configuration in accordance with an embodiment of the invention.

FIG. 3 is a schematic representation of a voltage source current controlled power converter 200 including N voltage levels in a floating capacitor configuration in accordance with an embodiment of the invention. In this embodiment, the voltage source current controlled power converter 200 includes a floating capacitor configuration which includes the first conductive path 216 and the second conductive path 218 coupled in parallel to each other and the first conductive path 216 and the second conductive path 218 are coupled to the input terminal 212 at the first end 220 and to the output terminal 214 at the second end 222. Each of the conductive paths 216, 218 includes at least one diode 224, 2224 coupled in series to the respective conductive paths.

In the embodiment of FIG. 3, the first conductive path 216 includes a plurality of first switching elements (FSE) 2000, and the second conductive path 218 includes a plurality of second switching elements (SSE) 2200. The first switching elements 2000 and the second switching elements 2200 may include unidirectional switches and/or additional diodes depending on capacitor voltages of the voltage source current controlled power converter.

In the embodiment of FIG. 3, the capacitors 228 are coupled between a respective pair of the first switching elements 2000 at a first capacitor node 246 and between a respective pair of the second switching elements 2200 at a second capacitor node 248. The first capacitor node 246 is coupled to the first conductive path 216 and the second capacitor node 248 is coupled to the second conductive path 218.

Figure 4:
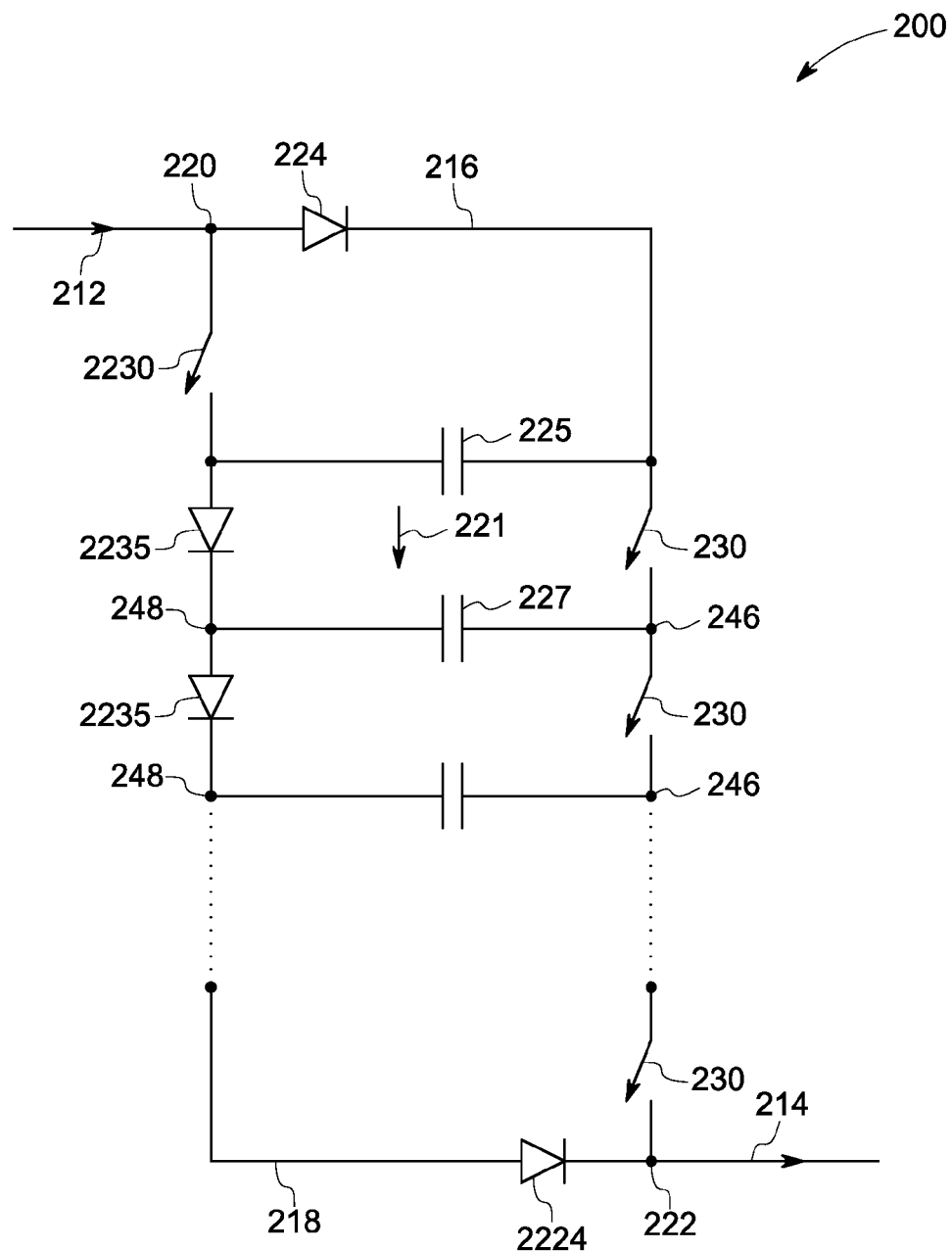
FIG. 4 is a schematic representation of an embodiment of a floating capacitor configuration of the power converter including switches in the first conductive path and diodes in the second conductive path in accordance with an embodiment of the invention.

FIG. 4 is a schematic representation of one specific embodiment of a floating capacitor configuration of the power converter 200 including switches 230 in the first conductive path 216 and diodes 2235 in the second conductive path 218 in accordance with an embodiment of the invention. In the embodiment of FIG. 4, the voltage of a first capacitor 225 is greater than the voltage of a second capacitor 227 as represented by arrow 221, and the plurality of first switching elements 2000 (shown in FIG. 3) in the first conductive path 216 include unidirectional switches 230 coupled in series to each other, and the plurality of second switching elements 2200 (shown in FIG. 3) in the second conductive path 218 includes diodes 2235 coupled in series to each other.

Figure 5:
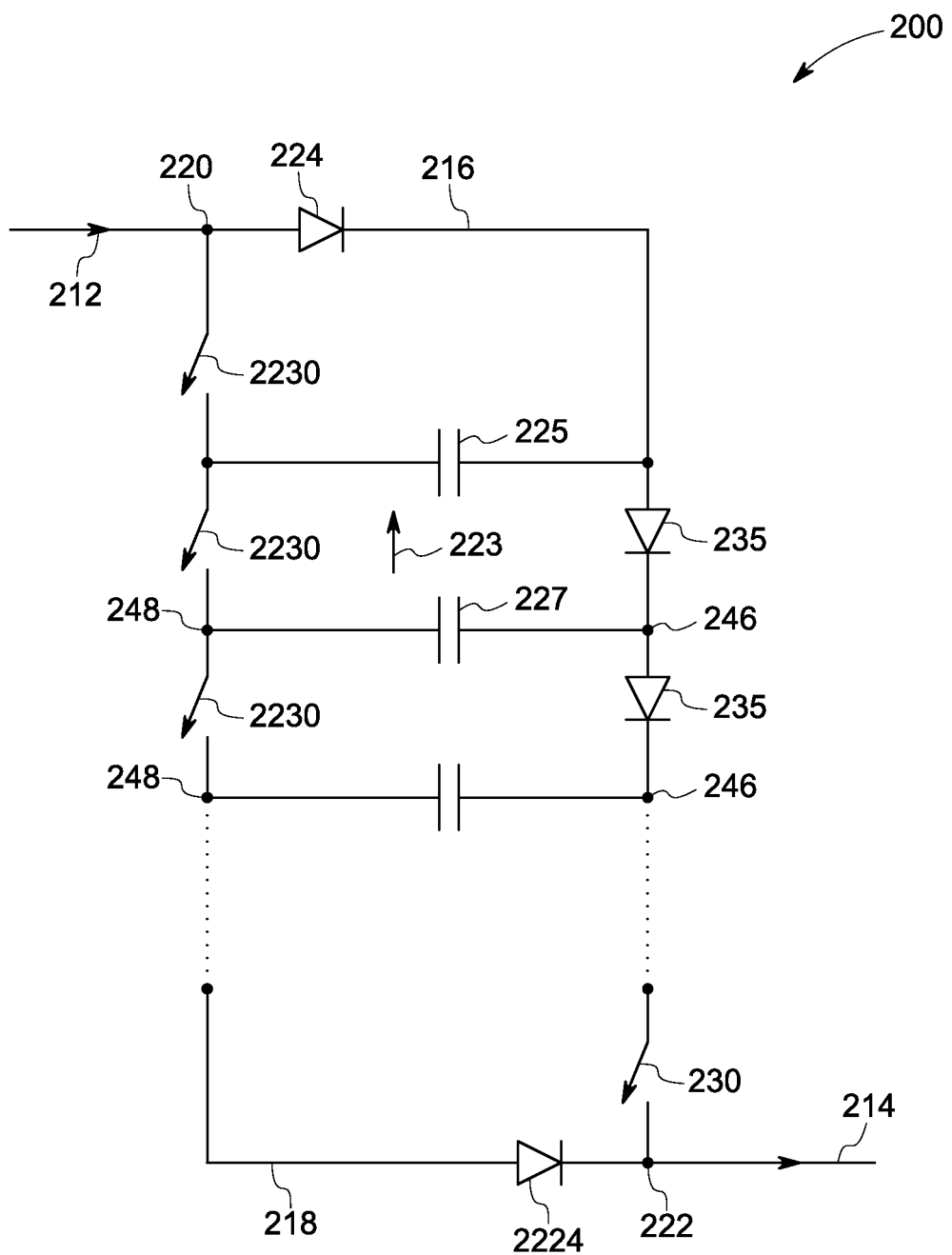
FIG. 5 is a schematic representation of another embodiment of a floating capacitor configuration of the power converter including switches in the second conductive path and diodes in the first conductive path in accordance with an embodiment of the invention.

FIG. 5 is a schematic representation of another embodiment of a floating capacitor configuration of the power converter 200 including switches 2230 in the second conductive path 218 and diodes 235 in the first conductive path 216 in accordance with an embodiment of the invention. In the embodiment of FIG. 5, the voltage of a first capacitor 225 is lower than the voltage of a second capacitor 227 as represented by arrow 223, and the plurality of first switching elements 2000 (FIG. 3) in the first conductive path 216 includes diodes 235 coupled in series to each other, and the plurality of second switching elements 2200 (shown in FIG. 3) in the second conductive path 218 includes unidirectional switches 2230 coupled in series to each other.

Figure 6:
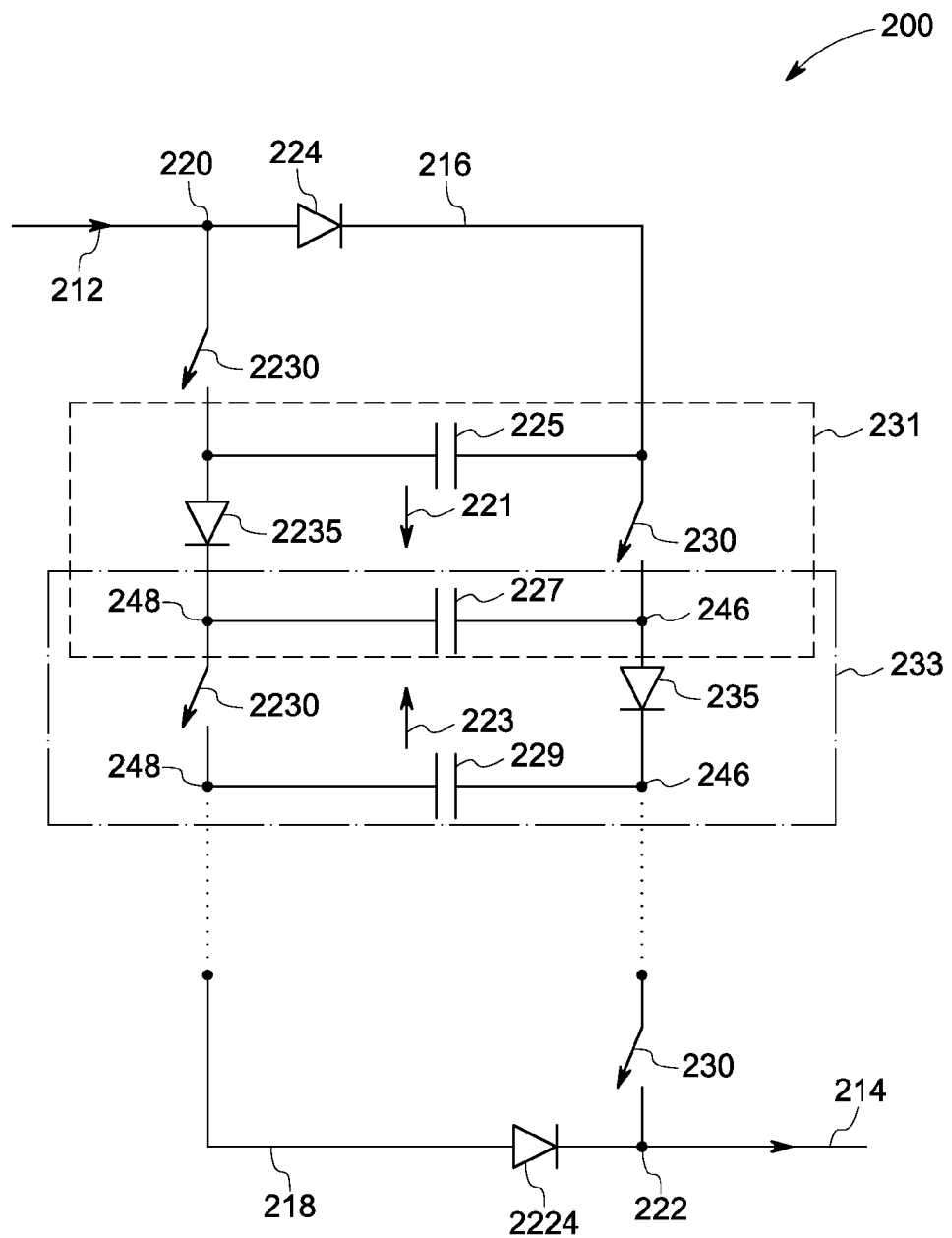
FIG. 6 is a schematic representation of yet another embodiment of a floating capacitor configuration of the power converter including switches and diodes in the first conductive path and the second conductive path in accordance with an embodiment of the invention.

FIG. 6 is a schematic representation of yet another embodiment of a floating capacitor configuration of the power converter 200 including switches 230, 2230 and diodes 224, 235, 2224, 2235 in the first conductive path 216 and the second conductive path 218 in accordance with an embodiment of the invention. The first capacitor 225 and the second capacitor 227 form a first cell 231, and the second capacitor 227 and a third capacitor 229 forms a second cell 233. Assuming that the first capacitor 225 has a voltage greater than the second capacitor 227 as represented by arrow 221, the first switching elements 2000 (shown in FIG. 3) in the first conductive path 216 will have a unidirectional switch 230, and the second switching element 2200 (shown in FIG. 3) in the second conductive path 218 will include a diode 2235 in the first cell 231. Furthermore, if the voltage in the second capacitor 227 is lower than the voltage in the third capacitor 229 as represented by arrow 223, the first switching element 2000 in the first conductive path 216 of the second cell 233 will include the diode 235 and the second switching element 2200 in the second conductive path 218 of the second cell 233 will include the unidirectional switch 2230. The process is repeated for M number of cells for providing N levels of voltage based on the voltages in the two capacitors in one cell.

Figure 7:
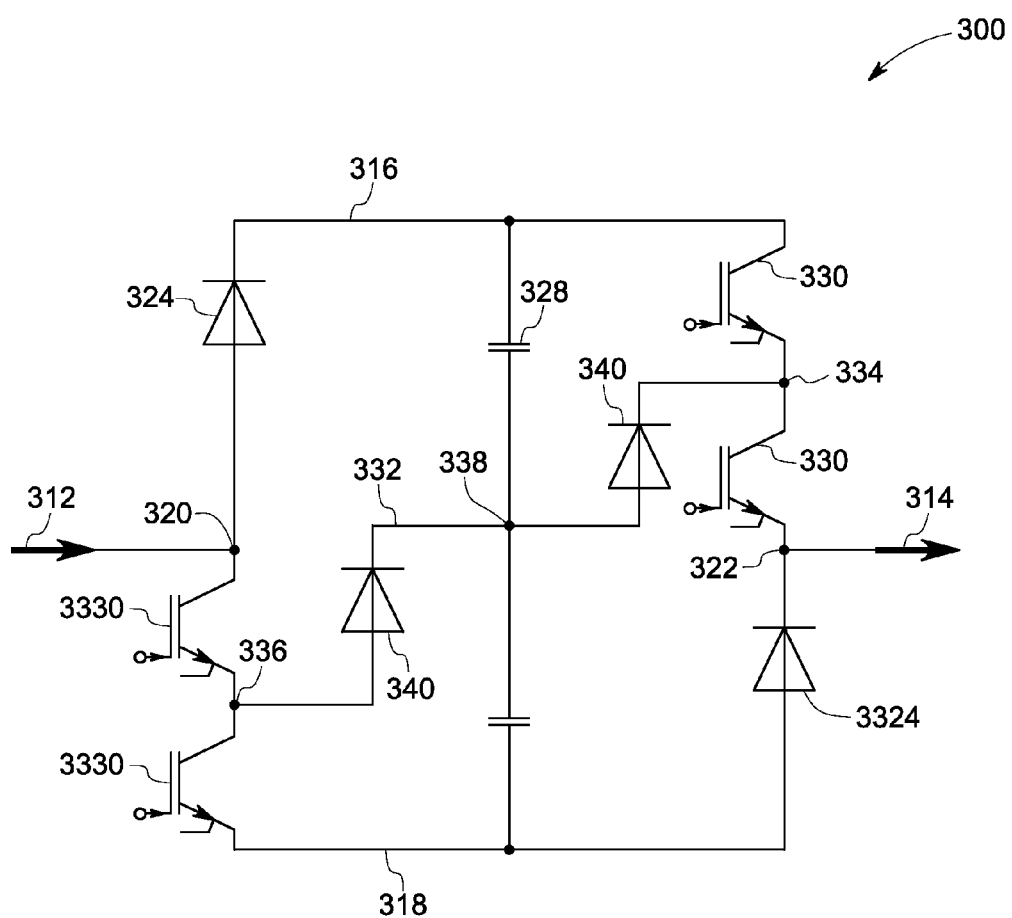
FIG. 7 is a schematic representation of an exemplary voltage source current controlled power converter including five voltage levels in a diode clamped configuration in accordance with an embodiment of the invention.

FIG. 7 is a schematic representation of an exemplary voltage source current controlled power converter 300 including five voltage levels in a diode clamped configuration in accordance with an embodiment of the invention. The voltage source current controlled power converter 300 includes a diode clamped configuration which includes the first conductive path 316 and the second conductive path 318 coupled in parallel to each other, and the first conductive path 316 and the second conductive path 318 are coupled to the input terminal 312 at the first end 320 and to the output terminal 314 at the second end 322. Each of the conductive paths 316, 318 includes one diode 324, 3324 coupled in series to the respective conductive paths. The voltage source current controlled power converter 300 also includes two energy storage elements 328 coupled between the first conductive path 316 and the second conductive path 318. The voltage source current controlled power converter 300 includes two switches 330 in the first conductive path 316 and two switches 3330 in the second conductive path 318. The voltage source current controlled power converter 300 includes a converter leg 332 coupled between the switches 330 of the first conductive path 316 at the first node 334 and the switches 3330 of the second conductive path 318 at the second node 336. The converter leg 332 is coupled between the two energy storage elements 328 at an intermediate node 338, and the converter leg 332 includes two leg diodes 340 coupled in series to each other such that the intermediate node 338 is positioned between the two leg diodes 340.

Figure 8:
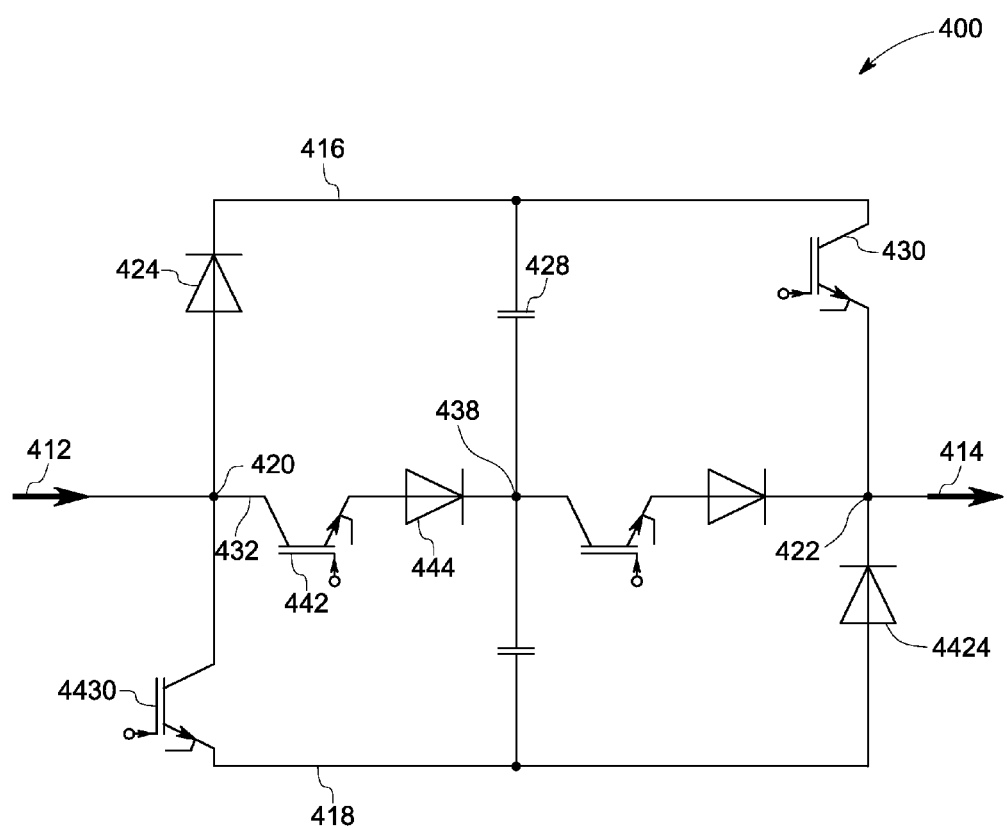
FIG. 8 is a schematic representation of an exemplary voltage source current controlled power converter including five voltage levels in an actively clamped configuration in accordance with an embodiment of the invention.

FIG. 8 is a schematic representation of a voltage source current controlled power converter 400 including five voltage levels in an actively clamped configuration in accordance with an embodiment of the invention. The voltage source current controlled power converter 400 includes an actively clamped configuration which includes the first conductive path 416 and the second conductive path 418 coupled in parallel to each other, and the first conductive path 416 and the second conductive path 418 are coupled to the input terminal 412 at the first end 420 and to the output terminal 414 at the second end 422. Each of the conductive paths 416, 418 includes one diode 424, 4424 coupled in series to the respective conductive paths. The voltage source current controlled power converter 400 also includes two energy storage elements 428 coupled between the first conductive path 416 and the second conductive path 418. The voltage source current controlled power converter 400 includes a converter leg 432 coupled between the first conductive path 416 and the second conductive path 418 at the first node and the second node respectively which coincide with the first end 420 and the second end 422. The converter leg 432 is coupled between the two energy storage elements 428 at an intermediate node 438 and includes a leg switch 442 and a leg diode 444 on both sides of the intermediate node 438.

Figure 9:
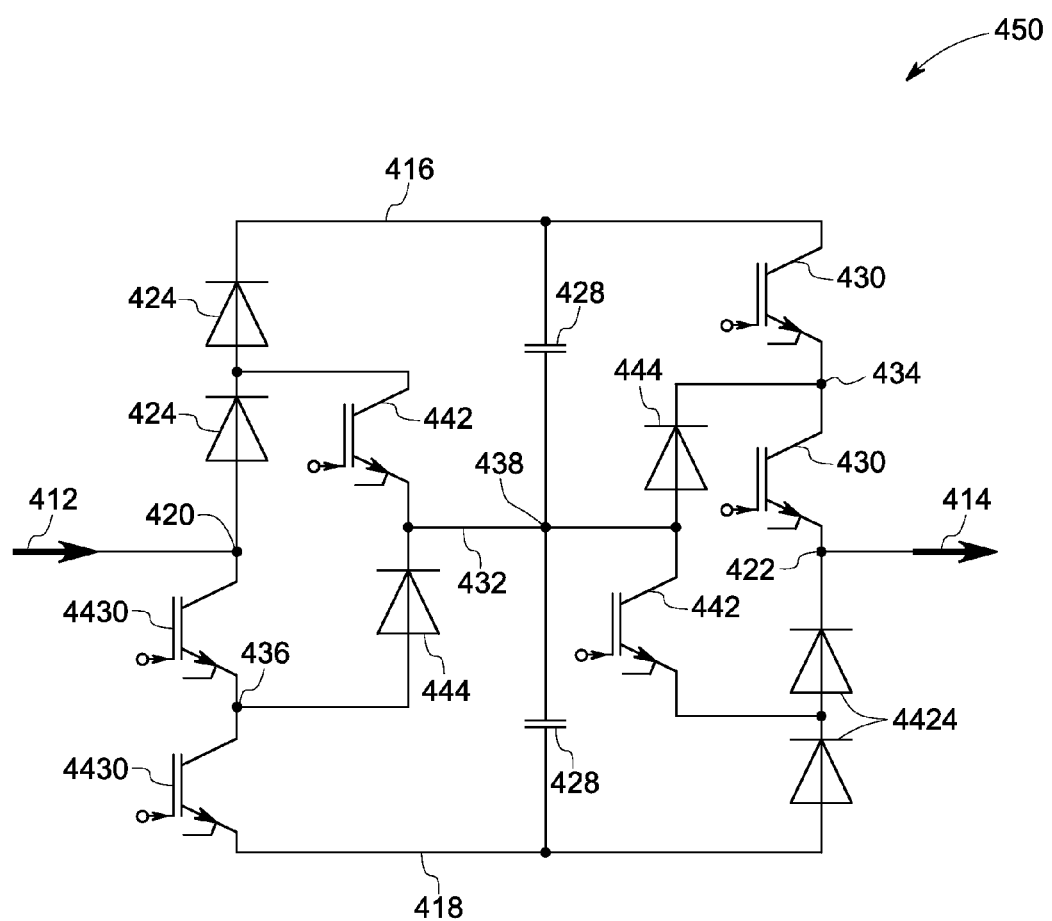
FIG. 9 is a schematic representation of another embodiment of an actively clamped configuration of a voltage source current controlled power converter including five voltage levels in accordance with an embodiment of the invention.

FIG. 9 is a schematic representation of an alternative embodiment of a voltage source current controlled power converter 400 including five voltage levels in an actively clamped configuration in accordance with an embodiment of the invention. The voltage source current controlled power converter 400 includes the converter leg 432 which is coupled between the two energy storage elements 428 at the intermediate node 438, and the converter leg 432 includes a leg switch 442 and a leg diode 444 on both sides of the intermediate node 438 wherein the leg switch 442 and the leg diode 444 on each side of the intermediate node 438 are coupled in series to each other.

Figure 10:
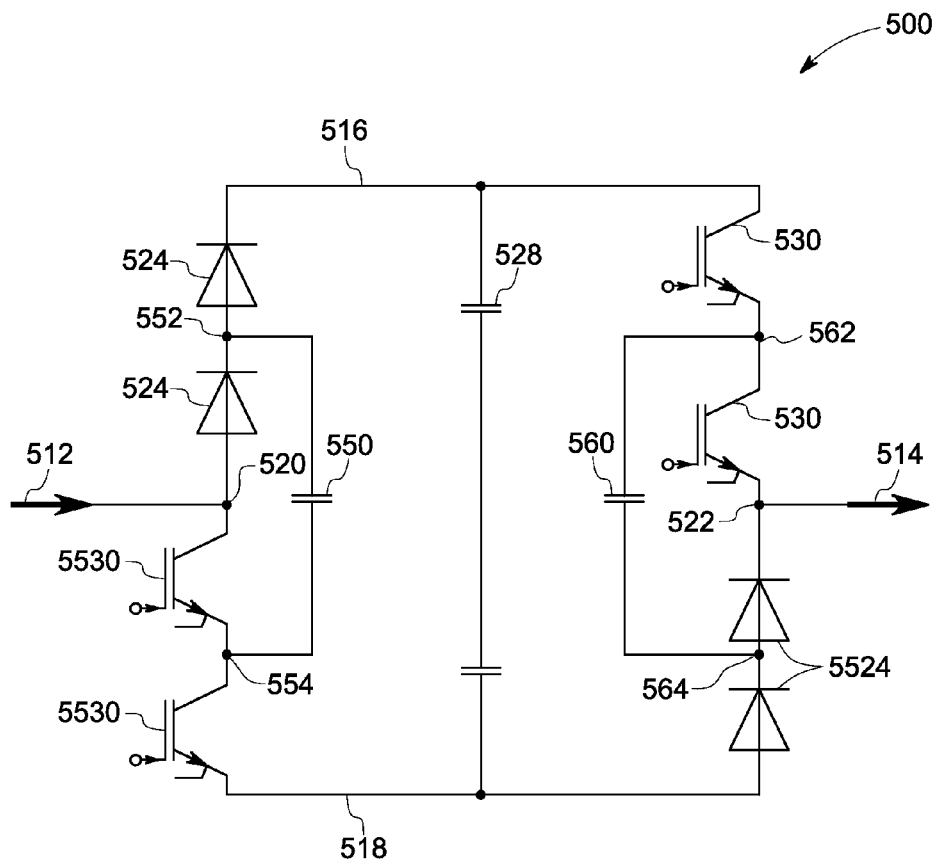
FIG. 10 is a schematic representation of an exemplary voltage source current controlled power converter including five voltage levels in a floating capacitor configuration in accordance with an embodiment of the invention.

FIG. 10 is a schematic representation of a voltage source current controlled power converter 500 including five voltage levels in a floating capacitor configuration in accordance with an embodiment of the invention. The voltage source current controlled power converter 500 includes a floating capacitor configuration which includes the first conductive path 516 and the second conductive path 518 coupled in parallel to each other and the first conductive path 516 and the second conductive path 518 are coupled to the input terminal 512 at the first end 520 and to the output terminal 514 at the second end 522. Each of the conductive paths 516, 518 includes two diodes 524, 5524 coupled in series to the respective conductive paths. Each of the conductive paths 516, 518 includes two switches 530, 5530 coupled in series to the respective conductive paths and two capacitors 528 are coupled between the first conductive path 516 and the second conductive path 518. A first capacitor 550 is coupled between the two diodes 524 of the first conductive path 516 at the first capacitor node 552 and between the two switches 5530 of the second conductive path 518 at the second capacitor node 554. The voltage source current controlled power converter 500 also includes a second capacitor 560 coupled between the switches 530 of the first conductive path 516 at the first capacitor node 562 and between the two diodes 5524 of the second conductive path 518 at the second capacitor node 564.

Figure 11:
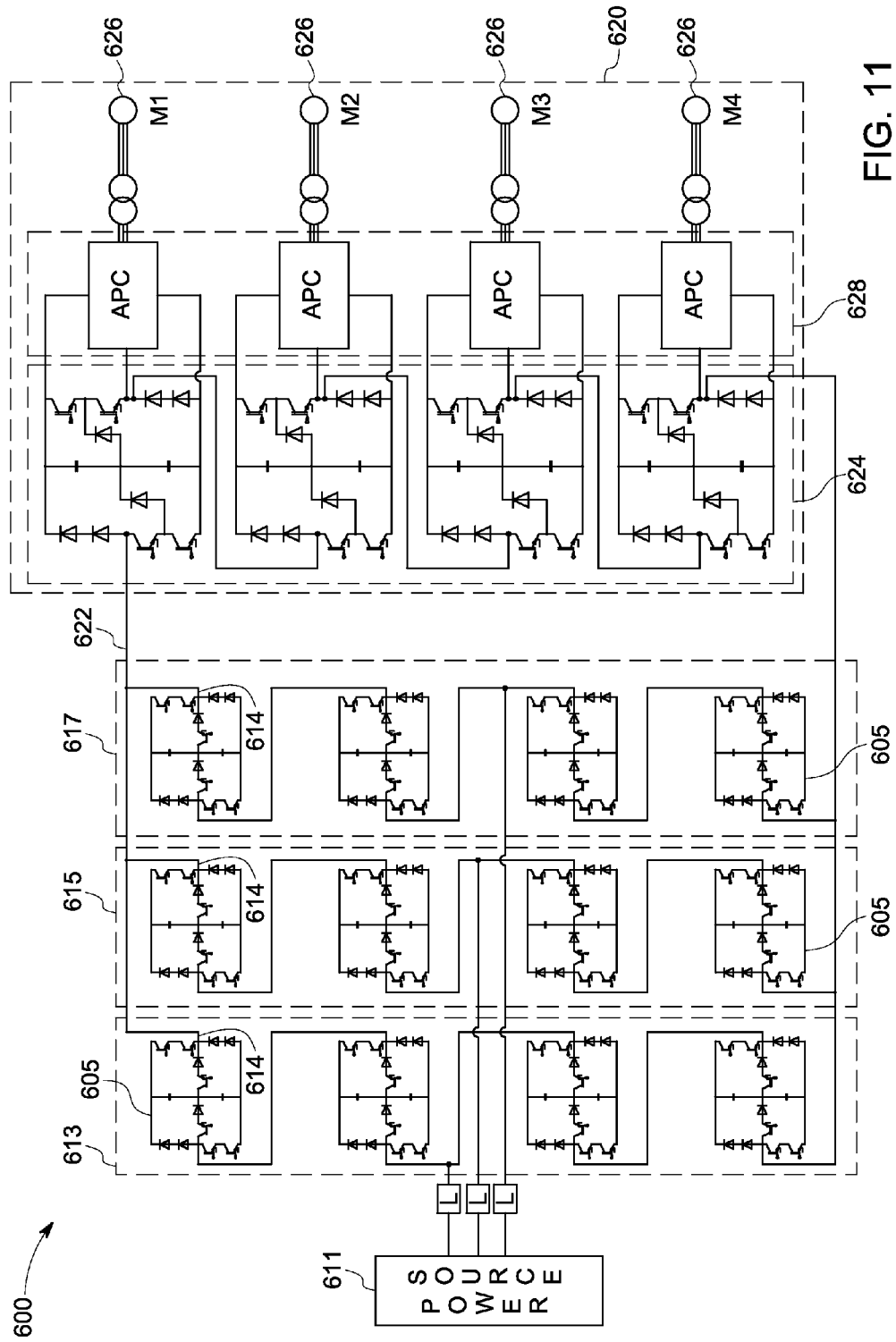
FIG. 11 is a schematic representation of a modular AC-DC power conversion system including power converter modules coupled to each other for converting AC power to DC power in accordance with an embodiment of the invention.

FIG. 11 is a schematic representation of a modular AC-DC power conversion system 600 including power converter modules 605 coupled to each other for converting AC power to DC power in accordance with an embodiment of the invention. The AC-DC power conversion system 600 includes a three phase input power source 611 configured to provide system input power to three phase sets 613, 615, 617 of the power converter modules 605 which are coupled in series to each other, and each phase set 613, 615, 617 converts one phase of the system input power to a system output power. In one embodiment, the number of power converter modules 605 which are coupled in series for one phase is dependent on the power rating and voltage ratings of the AC-DC power conversion system 600 and may include N number of power converter modules 605 coupled together in series. Each of the power converter modules 605 includes a voltage source current controlled power converter for providing unidirectional current having at least four output voltage levels and may include diode clamped configuration, actively clamped configuration, floating capacitor configuration, any variations of the aforementioned configurations or a combination thereof. The output terminals 614 of the voltage source current controlled power converter modules 605 are coupled together and the modular output power is transmitted to a receiver end 620 via a DC link 622. Receiver end power converter modules 624 may include any of the aforementioned configurations but are used in a different way as compared to the voltage source current controlled power converter modules 605. The receiver end power converter modules 624 are coupled to individual loads 626 such as motors, and the first conductive path and the second conductive path of the receiver end power converter module 624 are configured to operate as a DC link to provide the modular output power to the individual loads 626. Moreover, the receiver end power converter modules 624 are configured to provide the same modular output power level when two or more receiver end power converter modules 624 are coupled together. The receiver end power converter modules 624 provide the received modular output power according to the individual load 626 requirements. Each of the receiver end converter modules 624 is coupled to an additional power converter 628 via a DC port where the additional power converter 628 converts the required modular output power received from the receiver end power converter module 624 to the system output power which is used to operate the load 626 at the receiver end 620.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power converter module comprising:
 a voltage source current controlled power converter for providing unidirectional current having at least four output voltage levels, the power converter comprising:
 an input terminal for receiving modular input current;
 an output terminal for providing modular output current;
 a first conductive path and a second conductive path coupled in parallel to each other between the input terminal and the output terminal, wherein each of the first and second conductive paths comprises at least one diode coupled in series to the respective conductive path and at least one switch coupled in series to the respective conductive path, wherein the at least one diode in the first conductive path is coupled closer to the input terminal than the output terminal and the at least one diode in the second conductive path is coupled to the second conductive path closer to the output terminal than the input terminal; and at least two energy storage elements coupled between the first conductive path and the second conductive path.

2. The module of claim 1, wherein the power converter comprises converter legs coupled between the first conductive path and the second conductive path and each of the converter legs is coupled between a respective pair of energy storage elements at an intermediate node.

3. The module of claim 2, wherein the power converter comprises a plurality of switches coupled in series to each other in the first conductive path and the second conductive path.

4. The module of claim 3, wherein each converter leg is coupled between a respective pair of switches in the first conductive path at a first node and between a corresponding pair of switches in the second conductive path at a second node.

5. The module of claim 4, wherein each converter leg comprises two leg diodes coupled in series to each other such that the intermediate node is positioned between the two leg diodes.

6. The module of claim 2, wherein each converter leg comprises a leg switch and a leg diode on both sides of the intermediate node.

7. The module of claim 1, wherein the first conductive path comprises a plurality of first switching elements in addition to the at least one switch coupled to the first conductive path and the second conductive path comprises a plurality of second switching elements in addition to the at least one switch coupled to the second conductive path, and wherein each of the at least two energy storage elements is coupled between a respective pair of first switching elements at a first capacitor node and between a respective pair of second switching elements at a second capacitor node.

8. The module of claim 7, wherein each of the plurality of first switching elements and each the plurality of second switching elements comprises a unidirectional switch and an additional diode, and wherein the plurality of second switching elements comprise unidirectional switches if the plurality of first switching elements comprise additional diodes or the plurality of second switching elements comprise additional diodes if the plurality of first switching elements comprise unidirectional switches.

9. The module of claim 1, wherein the energy storage element comprises a capacitor.

10. An alternating current (AC) power to direct current (DC) power conversion system comprising:

power source for providing a system input power;

at least one phase set of power converter modules coupled in series to each other for converting at least one phase of the system input power to a system output power wherein each power converter module comprises:

a voltage source current controlled power converter for providing unidirectional current having at least four output voltage levels, the power converter comprising:

an input terminal for receiving modular input current;

an output terminal for providing modular output current;

a first conductive path and a second conductive path coupled in parallel to each other between the input terminal and the output terminal, wherein each of the first and second conductive paths comprises at least one diode coupled in series to the respective conductive path and at least one switch coupled in series to the respective conductive path, wherein the at least one diode in the first conductive path is coupled to the first conductive path closer to the input terminal than the output terminal, and the at least one diode in the second conductive path is coupled to the second conductive path closer to the output terminal than the input terminal; and at least two energy storage elements coupled between the first conductive path and the second conductive path; and at least one receiver end power converter module coupled to the at least one phase set of converter modules via a DC link.

11. The power conversion system of claim 10, wherein the power converter comprises converter legs coupled between the first conductive path and the second conductive path and each of the converter legs is coupled between a respective pair of energy storage elements at an intermediate node.

12. The power converter system of claim 11, wherein the power converter comprises a plurality of switches coupled in series to each other in the first conductive path and the second conductive path.

13. The power conversion system of claim 12, wherein each converter leg is coupled between a respective pair of switches in the first conductive path at a first node and between a corresponding pair of switches in the second conductive path at a second node.

14. The power conversion system of claim 13, wherein each converter leg comprises two leg diodes coupled in series to each other such that the intermediate node is positioned between the two leg diodes.

15. The power conversion system of claim 11, wherein each converter leg comprises a leg switch and a leg diode on both sides of the intermediate node.

16. The power conversion system of claim 10, wherein the first conductive path comprises a plurality of first switching elements in addition to the at least one switch coupled to the first conductive path and the second conductive path comprises a plurality of second switching elements in addition to the at least one switch coupled to the second conductive path, and wherein each of the at least two energy storage elements is coupled between a respective pair of first switching elements at a first capacitor node and between a respective pair of second switching elements at a second capacitor node.

17. The power conversion system of claim 16, wherein each of the plurality of first switching elements and each the plurality of second switching elements comprises a unidirectional switch and an additional diode, and wherein the plurality of second switching elements comprises unidirectional switches if the plurality of first switching elements comprises additional diodes or the plurality of second switching elements comprises additional diodes if the plurality of first switching elements comprises unidirectional switches.

18. The power conversion system of claim 10, wherein the energy storage element comprises a capacitor.

19. The power conversion system of claim 10, wherein the power conversion system comprises a modular stacked power conversion system.

20. The power conversion system of claim 10, wherein the at least one receiver end power converter module is coupled to a respective additional power converter via a DC port and provides a received modular output power to the additional power converter based on at least one individual load coupled to the additional power converter.

* * * * *